Figure 1:
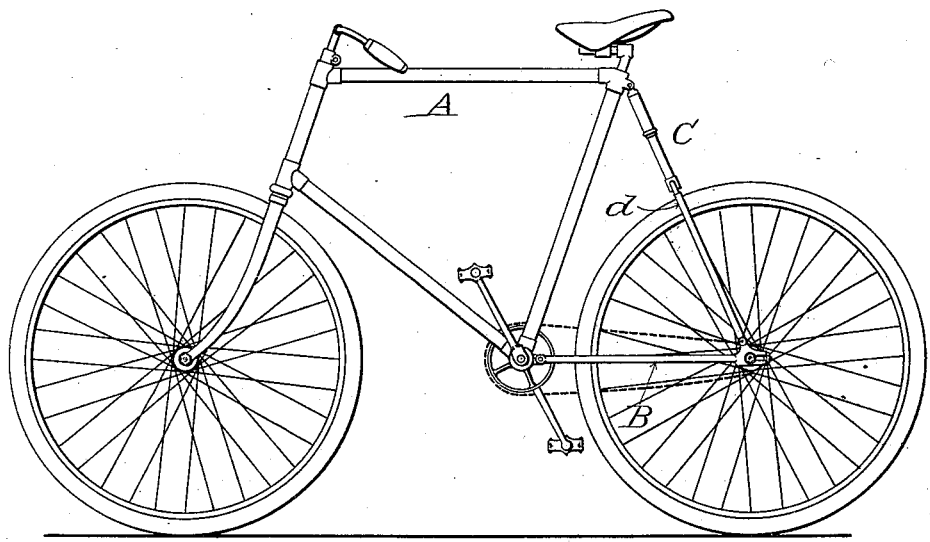

(No Model.) 2 Sheets—Sheet 1.
C. L. TRAVIS.
BICYCLE OR LIKE VEHICLE.

No. 564,546. Patented July 21, 1896.

Witnesses
C. C. Burdine
J. M. Pond

Inventor:
Charles L. Travis,
by Dodge & Sons,
Attorneys.

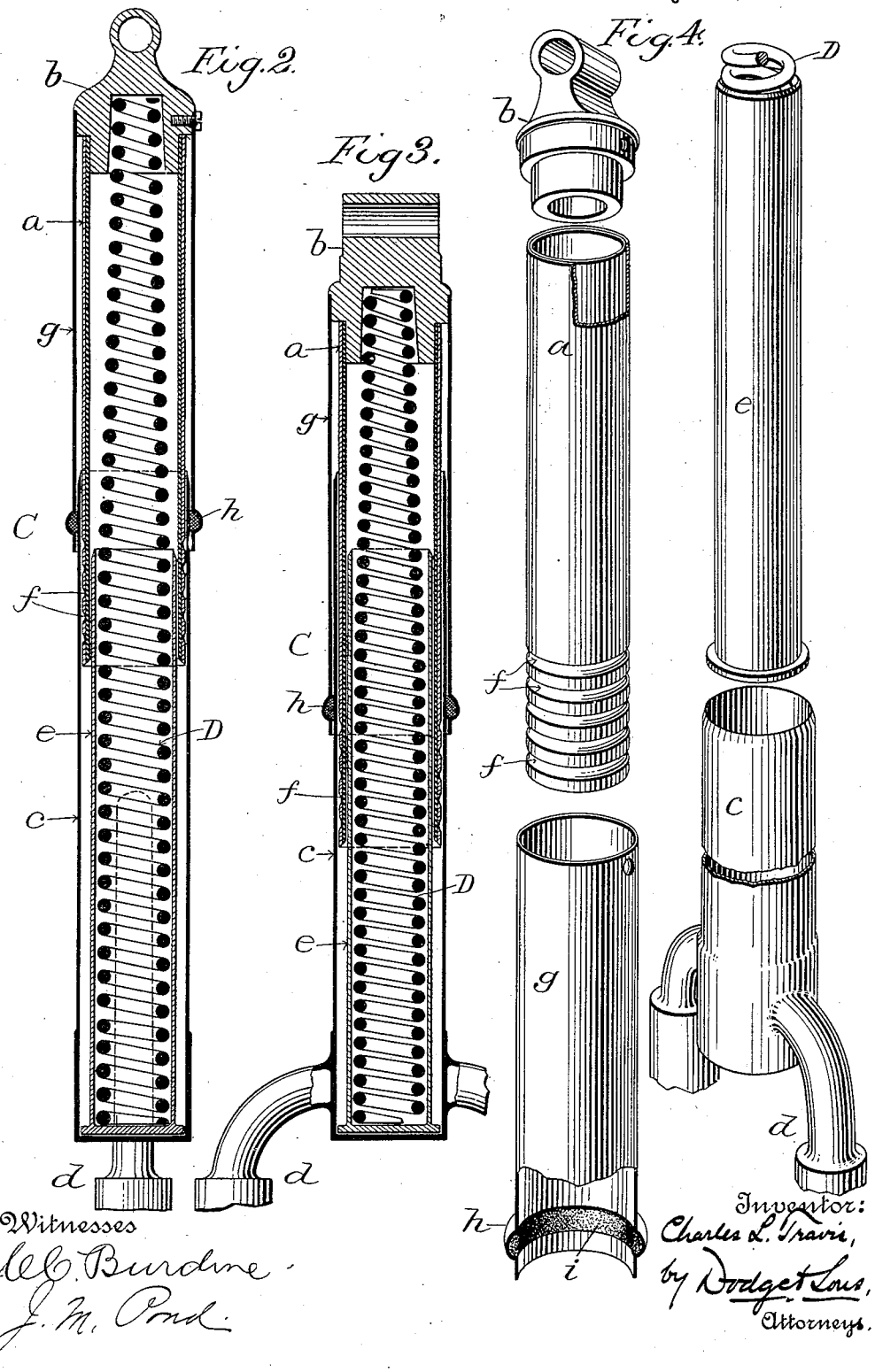

UNITED STATES PATENT OFFICE.

CHARLES L. TRAVIS, OF MINNEAPOLIS, MINNESOTA, ASSIGNOR TO THE HYGIENIC WHEEL COMPANY, OF PHILADELPHIA, PENNSYLVANIA.

BICYCLE OR LIKE VEHICLE.

SPECIFICATION forming part of Letters Patent No. 564,546, dated July 21, 1896.

Application filed January 31, 1896. Serial No. 577,591. (No model.) Patented in Belgium March 17, 1896, No. 120,374, and in Italy March 31, 1896, XXXI, 41,078, LXXX, 378.

*To all whom it may concern:*

Be it known that I, CHARLES L. TRAVIS, a citizen of the United States, residing at Minneapolis, in the county of Hennepin and State of Minnesota, have invented certain new and useful Improvements in Bicycles or Like Vehicles, (for which I have received Letters Patent of Italy, No. XXXI, 41,078, LXXX, 378, dated March 31, 1896, and of Belgium, No. 120,374, dated March 17, 1896,) of which the following is a specification.

My invention pertains to bicycles and like vehicles, and has reference more particularly to a yielding brace designed to relieve the machine and the rider of the effect of sudden jolts, shocks, and concussions.

The invention is applicable to various parts of such vehicles, but is especially designed for and peculiarly serviceable in or as a part of the rear brace interposed between a rigid front frame and a rear-wheel fork or frame pivotally or flexibly connected with the front frame, where it serves to take up the vibration and movements of the wheels which would otherwise be transmitted to the rider.

Figure 1 is a side elevation of a bicycle embodying my invention; Fig. 2, a longitudinal sectional view of the telescopic brace in which my invention is here embodied; Fig. 3, a similar section at right angles to the preceding and showing the spring somewhat compressed; Fig. 4, a perspective view showing the several members separated.

For the purpose of better explaining the aim of the invention and its preferred adaptation I will first refer to Fig. 1, wherein A indicates a front frame comprising the steering-fork head or barrel, a saddle-post tube, and two connecting bars or braces as in the common "diamond" frame at present so generally used by different makers.

B indicates a rear-wheel fork hinged or flexibly connected to the front frame A at or near the pedal-shaft barrel, and C a brace extending from the rear portion of fork B to the upper rear portion of frame A, to both of which it is jointed or flexibly connected. This brace comprises two tubular sections telescoping or sliding one within the other, and an interposed spring, designed to permit a movement of the rear-wheel fork and its wheel without affecting the front frame or the saddle carried thereon.

Thus far the description discloses only matters which are not broadly or separately claimed in this application, but the essential features of the present invention are embodied in the telescopic brace and will now be described.

Brace C comprises a tubular shell *a*, at the top of which is a cap or plug *b*, preferably brazed to the tube, and a second tubular shell *c* of a size to receive and closely fit the shell *a*, said second shell forming the upper member or extension of a fork *d*, which straddles the rear wheel and is jointed or flexibly connected with the rear-wheel fork near the rear end of the latter.

Within the shells *a* and *c* is placed a strong spiral spring D, which is advisably made of gradual taper from end to end, in order that it may yield more readily in one than in another portion and adapt itself in considerable degree to riders of widely-differing weights.

The space available in bicycles for the use of such a telescopic brace is somewhat limited, yet unless the spring be quite long and elastic it is of little or no benefit. It is therefore of marked importance to so construct the telescopic section as to permit the spring to occupy substantially its entire length, and this is attained by the employment of the tubular shells instead of a tube and plunger, or a stem and collar, with an interposed spring, as in some cases proposed by others. To further add to the available room for the spring, the plug or cap *b* is centrally bored to near its top, as seen in Figs. 2 and 3, thus giving space for the reduced upper end of spring D, and centering the same in shell *a*, which is quite desirable.

For the purpose of centering the lower portion of spring D and preventing shell *a* from rubbing against it, I place within the lower shell *c* a spring case or cup *e*, the lower end of which is enlarged to fit nicely in shell *b*, while its body is of a diameter to pass freely into the shell *a*, as shown.

It is well known that less friction is produced between dissimilar metals and alloys, properly selected, than between two parts of like metal or alloy, brass and steel, for instance, giving less friction than steel and steel or brass and brass. To secure the advantage of such combination or relation, I may adopt the construction illustrated in Figs. 2, 3, and 4, where the shell $a$ will be seen to consist of two thicknesses of metal. Of these the inner tube or body of the shell is of steel, while the outer thickness is of brass or like alloy, soldered or "sweated" upon the steel tube.

In making up the compound shell I first take a steel tube slightly thicker than it is desired to be in its finished state. This tube is cut to the desired length, and has the cap or end piece $b$ brazed or otherwise secured to it, after which it is duly centered and bored or reamed to render its interior smooth and true. Its outer surface may also be dressed, if necessary, and is thoroughly tinned, after which a tube of brass or like alloy of a size to encircle and closely fit the steel tube is passed over it and the two are united by "sweating," which consists in heating until the tin or solder is melted between the two bodies, and then allowing the parts to cool and the solder to set. The brass tube may be heated to facilitate its passage over or around the steel tube, and its subsequent cooling and contraction will give the requisite close fit. The heat may be sufficient to effect the fusion of the tin or solder, and thus one operation may be made to effect both results. I do not, however, restrict myself to this mode of putting the tubes together. After the brass tube is duly secured upon the steel it is recentered in the latter, and its surface is dressed off true and smooth to nicely fit the interior of shell $c$.

It is proper to say here that the spaces between tubes is necessarily exaggerated somewhat in the drawings for clearness of illustration, but that the fit should be a reasonably close one in practice.

Having the brass cup or case $e$ next to the spring D and within shell $a$, and the brass covering of shell $a$ next to the inner surface of shell $c$, it will be seen that brass and steel are opposed or brought into working relation at all points, and thus friction and wear are lessened.

In the practical use of a telescopic spring-brace of this character it has been found difficult so to proportion the stiffness of the spring and the range of movement to the weight of the rider as to adapt the device to yield properly to light and heavy jars or jolts, and the consequence has been that a middle ground has necessarily been sought, resulting in a somewhat inadequate play when riding over a road of only moderate roughness and an undue play when riding over very rough roads. The present invention overcomes this difficulty and causes the cushioning action or effect to be proportioned directly and exactly to the unevenness encountered, and the consequent rise or fall of either wheel relatively to the rider. This desirable result is attained by the aid of a pneumatic spring or cushion acting in conjunction with and supplementing the metallic spring D. Broadly considered, this combination is embraced in an earlier application filed in my name, and it is claimed herein only in so far as the present construction differs from that previously set forth, but by the present construction I am enabled to conceal the spring, to employ a larger body of confined air, and generally to improve the device both in construction and in appearance.

Shells $a$ and $c$ fit so closely together that when a fairly thick lubricant such as vaseline or a heavy oil is applied between them they work air-tight together, and consequently any air contained within them as they first begin to telescope must remain therein and be more and more compressed as the telescoping or sliding together proceeds. The better to insure retention of the lubricant in the space between the two shells I form circumferential grooves $f$ in the shell $a$, as shown in Figs. 2, 3, and 4. These grooves become filled with the lubricant and insure a tight joint at all times.

In practice the spring D is heavily coated with vaseline or other comparatively thick lubricant to keep it from rusting and prevent its coils from rubbing or grinding either upon one another or upon the interior of the shell $a$ and spring case or cup $e$, should they come into contact with the latter, and if it be desired at any time to reduce the air-space within the telescopic member it may be done by putting a larger quantity of vaseline in the cup or spring-case $e$, or by inserting a stem or spindle of wood or other light material, as indicated by dotted lines in Fig. 2. The space between shell $c$ and cup or spring-case $e$ may likewise be reduced by the use of vaseline or other lubricant, if desired, this of course being a part of the confined air-space.

The lubricant applied, as set forth, causes a free and noiseless action of the parts, but of course the lubricant will work out upon the exposed portion of shell $a$, and if not prevented will flow down over the outside of shell $c$. If exposed to the flying dust and grit encountered in riding, particularly on dusty or muddy roads, the greasy surface would speedily become coated with grit, which would cause rapid cutting and wear of the shells. It would also be very objectionable on account of soiling the clothes and the hands of the rider in riding or in handling the machine. To guard against these undesirable conditions, I provide an outer or covering shell $g$, the upper end of which is made fast to cap $b$, and the lower end of which reaches a short distance down over shell $c$ when the spring D is fully extended, as in Fig. 2. When the shells $a$ and $c$ are telescoped beyond their normal extent, as occurs when the spring D is compressed, the covering shell or guard *g* of course moves farther downward over shell *c*, as in Fig. 3.

To preclude the entrance of dust within the cover shell or guard *g*, and to prevent escape of lubricant, I spin or otherwise form in the lower end of shell or guard *g* a circumferential groove *h*, in which is seated a ring or washer *i*, of felt or like material, which maintains always a close joint between the shells *g* and *c*, and yet prevents any cutting or grinding of one by the other.

To facilitate the entrance of shell *c* into the washer or ring *i*, the upper end of said shell is beveled, as in Figs. 2, 3, and 4.

The guard-shell *g* may be made fast to cap *b* in any convenient way, the drawings showing it fitting against a shoulder of the cap and secured by a screw.

It will be seen that by my improved construction I am enabled to employ a long spring of adequate strength and of great elasticity, to completely inclose and hide the same, to combine therewith a pneumatic spring containing a sufficient body of air to afford a very perfect cushioning, even when exceedingly rough places are traversed, or when the machine is ridden up or down curbs, across gutters and railway-tracks, and otherwise subjected to severe treatment. The metallic spring carries the weight of the rider normally; but whenever the machine is subjected to a sudden and severe drop or is ridden over a large obstruction, which would cause the collapse of the metal spring and contact of the ends of shells *a* and *c*, the pneumatic spring comes instantly into play, offering a resistance which increases precisely as does the compression of spring D, and thus a uniform and very easy action is attained. All these desirable ends are secured without appreciably enlarging the rear brace, and without in any manner impairing the appearance of the machine. In fact, its appearance is so slightly altered that the change will often escape notice, but it is benefited rather than injured.

A machine provided with the improved brace herein described can be ridden with comfort and ease over roads upon which one not so provided could be ridden only with difficulty and serious discomfort, if at all, as has been abundantly demonstrated by repeated and severe tests.

In an application filed in my name under date November 2, 1895, Serial No. 567,743, I have made claim to the telescopic tubular brace broadly and without restriction to the air-tight fitting of its members, which latter feature enters into the present case and distinguishes it from that mentioned.

Having thus described my invention, what I claim is—

1. In combination with a rigid front frame, a rear-wheel fork flexibly connected with said front frame; a brace flexibly connected with the rear-wheel fork and with the front frame, and comprising shells *a* and *c* fitting air-tight one within the other; and a spring D inclosed within said shells and bearing at its ends against the outer ends of said shells, substantially as described and shown.

2. In a brace or support for bicycles and like vehicles, the combination of a pair of tubular shells arranged to telescope one within the other; a cup or case smaller than said shells, centrally located therein; and a spring extending from the closed outer end of one shell to the closed outer end of the other, and seated within said cup or case, for the purpose explained.

3. In a brace or support for bicycles and like vehicles, the combination of shell *a* provided with cap *b*, having a central cavity; shell *c* arranged to telescope with shell *a*; spring cup or case *e* placed within and concentric with shell *c*; and spring D, having one end seated in the cavity of cap *b*, and the other end seated in cup or case *e*, substantially as shown and described.

4. In combination with steel tube *c*; steel tube *a* faced on the outside with brass; brass cup or shell *e* located within shell *c*; and steel spring D seated within cup or shell *e*, whereby brass and steel surfaces are brought into opposition throughout.

5. The herein-described brace or support for bicycles and like vehicles, comprising shell *a* with its cap *b*; shell *c*; spring cup or case *e*; spring D; and outer shell or guard *g*, all combined and arranged to operate substantially as set forth.

In witness whereof I hereunto set my hand in the presence of two witnesses.

CHARLES L. TRAVIS.

Witnesses:
S. H. MYERS,
CHAS. R. CHUTE.